March 17, 1942.　　F. H. HIBBERD　　2,276,970
AIR CONDITIONING SYSTEM
Filed April 23, 1940
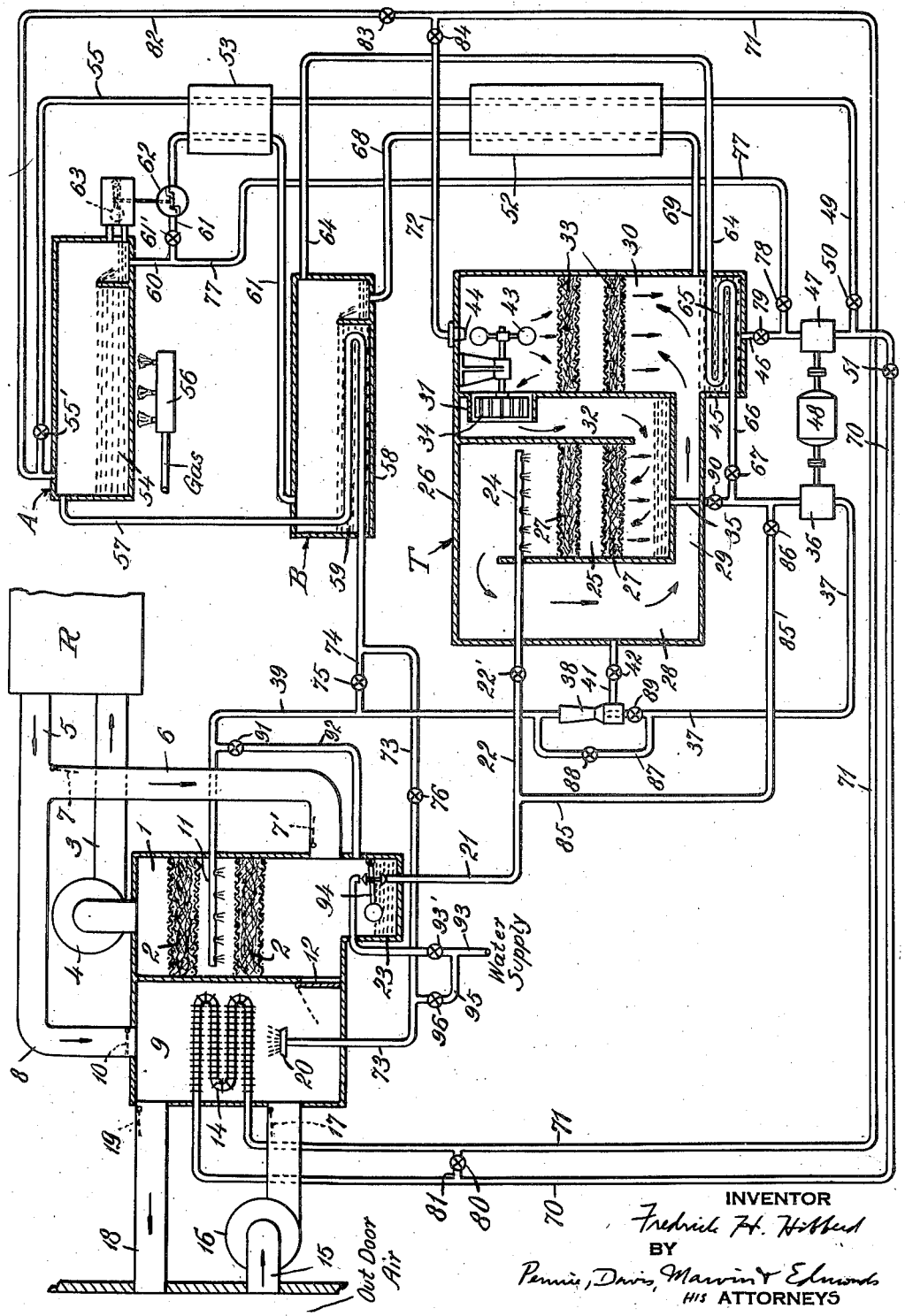
INVENTOR
Fredrick H. Hibberd
BY
Pennie, Davis, Marvin & Edmonds
HIS ATTORNEYS Patented Mar. 17, 1942

2,276,970

UNITED STATES PATENT OFFICE 2,276,970

AIR CONDITIONING SYSTEM

Frederick Hyde Hibberd, Harrison, N. Y.

Application April 23, 1940, Serial No. 331,101

12 Claims. (Cl. 257—9)

This invention relates to air conditioning, and more particularly concerns an improved system capable of both cooling and dehumidifying air that is too hot and humid, and heating and humidifying air that is too cool and dry for human comfort.

The conditioning of air in the warmer seasons and climates involves cooling and dehumidifying, and is usually accomplished by reducing the air temperature to a value below its dewpoint whereby water is condensed therefrom, after which the air is reheated, by mixture with untreated air or otherwise, to a point where its temperature and relative humidity are near the desired values. Cooling and dehumidification are not ordinarily required throughout the year. Thus in temperate climates, the outdoor air is too hot and humid for comfort during a few months only. Accordingly, air conditioning systems of the cooling and dehumidifying type are usable for a relatively small proportion of the time, and the cost thereof is tied up for considerable periods during the cooler seasons without any return to the owner.

It is the object of the present invention to provide an improved and economical air conditioning system capable of both cooling and dehumidifying air under warm weather conditions and heating and humidifying air under cold weather conditions. More specifically, it is proposed to provide apparatus involving units that act in combination to produce cooling and dehumidification, and also act without structural alteration to produce heating and humidification upon suitable adjustment of flow regulating valves and dampers. Various other specific objects, advantages and characteristic features of the invention will be pointed out or will become apparent as the description of a disclosed embodiment thereof progresses.

My improved air conditioning system employs two liquids comprising a primary solution which is brought in contact with the air to be conditioned and a secondary solution which is employed alternatively to remove absorbed moisture from and cool the primary solution under cooling operation or to heat the air to be conditioned under heating operation. Under cooling operation, heat and moisture absorbed from the room air by the primary solution are transferred to the secondary solution and removed from the secondary solution by evaporation and cooling. Under heating operation, the secondary solution acts to transfer heat to the treated air from the heating source of the evaporating equipment. The primary solution may be employed to impart moisture to this air, or alternatively, a water spray supplied directly from an outside source may be used for this purpose. An improved method and apparatus for performing a cooling and dehumidifying operation such as that here contemplated is disclosed and claimed in my copending application, Serial No. 209,652, filed May 24, 1938, and entitled "Method and apparatus for treating air."

In general, the apparatus comprising my improved system includes four units. A contactor is provided in which air from the room or enclosure is brought in contact with the primary solution whereby air is cooled and dehumidified by absorption or condensation of water, or may be humidified by evaporation of water from the solution to the air. A transfer unit acts to transfer heat and moisture from the primary solution to the secondary solution under cooling and dehumidifying operation. An evaporator unit concentrates the secondary solution by evaporation of water therefrom under cooling operation and heats the secondary solution under heating operation, and a radiator dissipates heat from the secondary solution to outdoor air under cooling operation and delivers heat from this solution to the room air under heating operation. The system also includes liquid circulating pumps which circulate the two solutions under both heating and cooling operation.

In describing the invention in detail, reference will be made to the accompanying drawing in which the single figure illustrates, in a diagrammatic and simplified manner, one embodiment of my improved system.

In general, my improved air conditioning system includes three fluid circuits. There is a primary solution circuit in which, under cooling conditions, a primary solution is passed in successive contact with the air to be treated and with dry rarefied air or gas which removes heat and moisture therefrom. Under heating operation, this circuit is altered so as to circulate the primary solution in contact with the treated air without cooling the primary solution. There is also a transfer circuit in which air or other inert gas under sub-atmospheric pressure is circulated in successive contact with the primary solution and a secondary hygroscopic salt solution whereby heat and moisture are transferred from the primary to the secondary solution. This transfer circuit operates only under cooling and dehumidifying conditions. The third circuit is the secondary solution circuit in which this solution, under cooling operation, is re-generated by ex= traction of moisture and heat therefrom after it has taken up heat and moisture through the transfer circuit. Under heating operation, the secondary solution circuit is altered so that the secondary solution is circulated between an evaporator in which it is heated and a radiator in which it delivers heat to the air under treatment. The radiator so employed also acts under cooling operation to dissipate heat from the secondary solution to the outdoor air.

Referring to the drawing, the apparatus there disclosed includes a contactor in which the primary solution, which may comprise water or a hygroscopic salt solution, is brought in contact with the air under treatment. The contactor comprises a chamber 1 provided with contactor surfaces or mats 2 for distributing the primary solution in thin films of extended surface area. An outlet duct 3 provided with a fan or blower 4 connects the contactor chamber 1 to the room R or other space to be conditioned. Return air from the room R is withdrawn through a duct 5 and a branch duct 6 leading to the lower end of the contactor chamber 1. The duct 6 may be closed by the dampers 7 and 7' at its opposite ends, whereupon the return air passes through the ducts 5 and 8 to a radiator chamber 9, a damper 10 in the duct 8 being opened for this purpose. A damper 12 at the bottom of the radiator chamber 9 controls the flow of air therefrom into the lower end of the contactor chamber 1. A spray pipe 11 is provided in the contactor chamber 1 and may be disposed between the mats 2 as shown.

A radiator 14 is disposed across the radiator chamber 9 as shown. This radiator may be of any suitable type capable of transmitting heat from a fluid passed through the ducts therein to air passing through the radiator chamber. A duct 15 provided with a blower 16 conducts outdoor air to the lower end of the radiator chamber under cooling operation, and a duct 18 connects the upper end of the chamber 9 to the outdoor atmosphere and may be closed by a damper 19. A spray head 20 or equivalent means is provided in the lower part of the chamber 9 below the radiator 14.

A transfer unit T is provided for cooling and removing water from the primary solution after it has been sprayed in contact with the air under treatment in the contactor chamber. The primary solution is withdrawn from the contactor chamber through the pipes 21 and 22, and is sprayed downwardly by a spray pipe 24 in an evaporation flue 25 within the chamber 26 of the transfer unit T. The primary solution is withdrawn from the sump 23 of the contactor chamber under the control of a float valve 94 which maintains the liquid level in this sump above the end of the pipe 21. A valve 22' is provided in the pipe 22 to cut off the flow of solution to the spray pipe 24 under heating operation. The flue 25 of the transfer unit T is preferably provided with contactor mats or filters 27 for distributing the sprayed solution in thin films of extended surface area.

The transfer unit chamber 26 is constructed to form a closed circuit for the circulation of rarefied air or other inert gas, the course of such circulation being indicated by arrows. The upper end of the flue 25 connects with a downwardly extending passage 28 and a horizontal passage 29 which leads to the lower end of a vertical absorption flue 30. The upper end of the flue 30 is connected through a fan casing 31 and a downwardly extending passage 32 to the lower end of the evaporation flue 25. Transverse contact mats or filters 33 are preferably provided in the flue 30, and a fan 34 in the casing 31 circulates the transfer fluid through the circuit just traced. The fluid circulated in the transfer chamber 26 is preferably maintained under a partial vacuum of more than 15 inches of mercury, and this vacuum may be from 25 inches to about 28 inches of mercury (assuming a 30 inch barometric pressure). The purpose of maintaining the transfer fluid under partial vacuum is to avoid substantial heat transfer through this fluid from the secondary solution which absorbs moisture in the flue 30 to the primary solution from which moisture is evaporated in the flue 25.

The primary solution, after passing downward through the fluid 25, is withdrawn from the transfer unit T through a pipe 35 by a pump 36 and is delivered through a pipe 37, a jet ejector 38 and a pipe 39 to the spray pipe 11 of the contactor chamber. The suction duct of the jet ejector is connected to the transfer unit casing 26 by a pipe 41, and a valve 42 or other suitable means may be provided to regulate the vacuum maintained by the jet ejector in the transfer unit. The degree of vacuum so maintained is preferably below that which will produce flashing or ebullition of the solutions circulated through this chamber.

The fan 34 for circulating transfer fluid within the casing 26 is preferably connected to and driven by an impeller 43 or equivalent means disposed in the path of the jet of secondary solution entering the flue 30 from a nozzle 44.

The secondary hygroscopic solution, in concentrated condition, enters the transfer unit T through the nozzle 44 at the top of the flue 30 and flows downward in spray form through this flue in contact with the rising stream of rarefied air and water vapor delivered from the flue 25 through the passages 28 and 29. Water vapor is absorbed from the rarefied air by the secondary solution in the flue 30, and this solution is consequently heated and diluted. The dry and dehumidified air is delivered from the top of the flue 30 through the passage 32 to the bottom of the flue 25.

The weak secondary solution collects in a sump 45 at the bottom of the flue 30 and is drawn off through a pipe 46 by a pump 47. The pumps 36 and 47 are preferably driven by a single electric motor or equivalent means 48 as shown. A two-effect evaporator is preferably employed to concentrate the secondary solution. A portion of this solution is diverted through a pipe 49 to the evaporator unit, the amount so diverted being controlled by suitable means such as the valves 50 and 51. The diverted portion of the secondary solution, which may be on the order of 5% of the output of the pump 47, passes successively through the heat exchangers 52 and 53 where its temperature is raised and then enters the evaporating pan 54 of the first effect evaporator A through the pipe 55 provided with a cut-off valve 55'. The pan 54 is heated by a suitable source such as the gas burner 56 and the water vapor or steam evolved passes out of the evaporator A through a pipe 57 to a heating coil 58 in the pan 59 of the second effect evaporator B. The solution which has been concentrated in the first effect evaporator A flows over the end of the pan 54, passes through pipes 60 and 61, through the heat exchanger 53 and is delivered to the pan 59 of the second effect evaporator B. A cut-off valve 61' is provided in the pipe 61. The flow of solution to the second effect evaporator B is controlled by a valve 62 operated by a float mechanism 63 responsive to the liquid level of the solution in the outlet section of the evaporator A. This arrangement prevents breaking of the vacuum maintained in the second effect evaporator B by the condenser 65 as hereinafter explained.

The water vapor evolved in the second effect evaporator B passes off through a pipe 64 to a condenser coil 65 located in the sump 45 of the flue 30 within the transfer unit T, and this water vapor is there condensed, delivering heat to the weak secondary solution in this sump. The condensate so obtained flows to the primary solution circuit through a pipe 66 controlled by a valve 67. This condensation of water vapor maintains the second effect evaporator under vacuum, and the condensate returned to the primary solution circuit at least partially replaces the water evaporated from the primary solution in the transfer unit. The valve 67 may if necessary be so adjusted as to maintain the condenser 65 under a pressure at which water vapor is condensed therein.

The concentrated secondary solution is returned from the second effect evaporator B through pipe 68, heat exchanger 52 and pipe 69 to the sump 45 of the transfer unit T and thus to the intake of the secondary solution pump 47.

The hot concentrated secondary solution is cooled by heat exchange with the outdoor air in the radiator unit. This solution is delivered by the pump 47 through the pipe 70 to the radiator 14 and back through the pipes 71 and 72 to the nozzle 44 in the transfer unit T. Under cooling operation, outdoor air is circulated over the radiator 14 by the fan 16, the dampers 17 and 19 being opened as shown. The cooling effect may be increased by spraying water from the spray head 20 into the air delivered by the fan 16 to the outlet end of the radiator 14. The water for this purpose may comprise the condensate from the heating coil 58 of the second effect evaporator B delivered through the pipe 73. A controlled amount of condensate from the heating coil 58 may be supplied to the primary solution circuit through the pipe 74. The flow of condensate to the primary solution circuit and to the spray head 20 may be controlled by the valve 75 in the pipe 74 and the valve 76 in the pipe 73.

Means are provided for circulating the secondary solution successively through the first effect evaporator A and the radiator 14 for the purpose of supplying heat to the radiator and so to the treated air under breaking operation. Thus a pipe 77 provided with a cut-off valve 78 connects the solution outlet pipe 60 of the first effect evaporator A to the intake pipe 46 of the secondary solution pump 47, and a valve 79 in the pipe 46 cuts off flow from the transfer unit sump 45 to the pump 47. The rate of flow of secondary solution through the radiator 14 under heating operation may be regulated by a valve 80 in a by-pass pipe 81 between the radiator supply and return pipes 70 and 71. A pipe 82 controlled by a valve 83 returns the secondary solution from the pipe 71 to the first effect evaporator A, and a valve 84 in the pipe 72 may be closed to prevent return of the secondary solution to the transfer unit T under heating operation.

Means are provided for circulating the primary solution in a closed circuit through the contactor chamber 1 under heating and humidifying condition. In the disclosed embodiment, this means comprises a pipe 85 controlled by a valve 86 and connected between the return pipe 21 leading from the contactor sump 23 and the inlet pipe 35 of the primary solution pump 36. A by-pass pipe 87 is provided around the jet ejector 38 and is controlled by the valves 88 and 89 located in the pipe 87 and the ejector inlet pipe respectively. A valve 90 is provided in the inlet pipe 35 between the transfer unit T and the primary solution return pipe 85 to close communication between the transfer unit and the pipe 36 under heating operation. The amount of solution circulated through the contactor chamber 1 may be variably controlled by a valve 91 in a by-pass pipe 92 connected between the contactor spray feed pipe 39 and the contactor sump 23. Make-up water may be supplied to the primary solution circuit through a pipe 93 under the control of the float valve 94 responsive to the water level in the contactor sump 23.

Instead of circulating the secondary solution through the contactor chamber 1, the treated air may be humidified under heating conditions by supplying water to the spray head 20 from the supply pipe 93 through the branch pipe 95 and the pipe 73 under control of the valve 96, the pipe 73 being isolated from the concentrating system by closing the valve 76. A hygrostat or similar device responsive to the condition of the treated air may be used to regulate the amount of water supplied to the spray head 20 through the valve 96.

The cooling and dehumidifying operation of my improved air conditioning system will now be described. The dampers 10 and 12 are closed and the dampers 7, 7', 17 and 19 are opened as shown in the drawing, and the fans 4 and 16 are operated. This causes the circulation of air from the room or enclosure R through the contactor chamber 1 (via duct 6, fan 4 and duct 3), and the separate circulation of outdoor air through the radiator 14 (via duct 15, fan 16, and duct 18). The primary solution circuit through the contactor chamber 1 and the transfer unit T is set up by opening the valves 22', 89, 90 and 42 and closing the valves 86 and 88. The secondary solution circuit is set up to include the evaporator unit and the radiator 14 by closing the valves 78, 80 and 83 and opening the valves 55', 79 and 61', the valves 50 and 51 being so adjusted that the suitable proportion of the secondary solution displaced by the pump 47 passes through the evaporating equipment. The primary solution may be water or a solution of a hygroscopic salt such as lithium chloride, lithium nitrate, calcium chloride or the like, and the secondary solution is preferably a solution of such a hygroscopic salt.

With the pumps 36 and 47 in operation, cooled primary solution is sprayed in contact with the air under treatment in the contactor chamber 1 with the result that it both cools this air and condenses or absorbs moisture therefrom, thus simultaneously lowering to the required values the relative humidity and the dry bulb temperature of the air returned to the room through the duct 3. The amount of cooling thus effected is determined by the temperature of the incoming primary solution, and when water is employed as the primary solution, its temperature also determines the dehumidifying effect. When a hygroscopic salt solution is used, the dehumidifying effect is separately variable in accordance with the concentration of the primary solution coming into contact with the air. The primary solution returned from the contactor chamber 1 is relatively warmer and contains the water that it has absorbed or condensed from the treated air.

The primary solution passes to the transfer unit T through the pipes 21 and 22 and is sprayed downwardly in the flue 25 from the spray pipe 24. The rarefied air or inert gas rising in the flue 25 is very dry, and moisture is evaporated in this air from the primary solution. This evaporation of moisture concentrates the primary solution if a salt solution is used, and in any case, cools this solution due to the absorption of heat as latent heat of vaporization. The amount of moisture evaporated from the primary solution to the air in the flue 25 is somewhat greater than the amount of moisture previously condensed or absorbed by the primary solution from the treated air in the contactor chamber 1. This is so because in re-generating the primary solution, it is not only necessary to remove the moisture it has condensed or absorbed, but also to remove the heat delivered to this solution as sensible heat from the treated air in the contactor chamber 1. Accordingly, the amount of moisture evaporated from the primary solution in the flue 25 corresponds to the sum of the dehumidifying and cooling effects produced in the air being treated. The excess of moisture removed from the primary solution in the flue 25 over that condensed or absorbed by this solution from the air is made up by returning water to the primary solution from the secondary solution, as explained above.

The cooled primary solution is returned to the contactor chamber 1 as explained above through the jet ejector 38, and this solution acts as the motive fluid for the ejector which draws air out of the transfer unit chamber 26 and discharges the air so withdrawn into the contactor chamber. Known means other than the jet ejector 38 may if desired be used to maintain the vacuum in the transfer unit.

The secondary hygroscopic solution in concentrated condition absorbs water vapor from the rarefied air as it flows downwardly through the absorption flue 30, and the secondary solution is thereby heated and diluted. The dry and dehumidified air is delivered from the top of the flue 30 by the fan 34 to the bottom of the evaporation flue 25. The secondary solution is then concentrated in the evaporators A and B, cooled by heat exchange with outdoor air in the radiator 14 and returned through the nozzle 44 to the transfer unit flue 30 as explained above.

The cooling and dehumidifying effects may be variably controlled by simple valve adjustments. Thus by adjusting the valve 91 which regulates the proportion of returned primary solution delivered to the contactor spray pipe 11 and the proportion by-passed through the pipe 92, the amount of primary solution passed into contact with the treated air may be altered whereby the cooling effect is changed. This operation may be performed in response to changes in room air temperature by employing suitable known temperature responsive devices or thermostats. The dehumidifying effect may be variably controlled by varying the amount of moisture returned from the secondary solution to the primary solution in the contactor chamber 1 through suitable adjustment of the valve 75. If a hygroscopic salt solution is employed as the primary solution, the return of water thereto lowers its concentration and accordingly decreases the amount of moisture it absorbs from the room air. The return of moisture to the primary solution in the contactor chamber 1 may be varied in accordance with changes in relative humidity of the room air by employing a known instrument such as a hygrostat or wet bulb thermostat connected to operate a valve 75 in pipe 74 through which moisture from the secondary solution is returned.

When it is desired to employ my improved system for heating and humidifying air, the apparatus is adjusted to cut out the transfer unit T, to circulate treated air successively through the radiator 14 and the contactor chamber 1, and to circulate the secondary solution successively through one stage of the evaporator and the radiator 14. The primary solution may be circulated through the contactor chamber 1 to humidify the heated air supplied to the enclosure. To effect this change to heating operation, the dampers 7, 7', 17 and 19 are closed, the fan 16 is shut down, the dampers 10 and 12 are opened and the fan 4 is operated. The fan 4 then circulates air from the room R through the ducts 5 and 8, downward through the radiator chamber 9, upward through the contactor chamber 1 and through the duct 3 back to the room. If desirable or necessary, the damper 19 may be opened slightly to introduce fresh outdoor air into the circuit.

The primary solution may be caused to flow in a closed circuit through the contactor chamber 1 by closing the valves 22', 90, 89, 42, 75 and 67 and opening the valves 86 and 88. The pump 36 then circulates the primary solution through the contactor chamber 1 and so supplies moisture to the treated air. Water may be supplied to the primary solution to replace that evaporated in the air by opening the valve 93' in a supply pipe 93, and the flow of make-up water may be controlled by the float mechanism 94 in the sump 23 as shown. The amount of water evaporated into the treated air may be regulated by adjustment of the valve 91 in the by-pass pipe 92.

If desired, circulation of the primary solution may be dispensed with and the treated air humidified by supplying water from the pipe 93 through the pipes 95 and 73 to the spray head 20 under control of the valve 96. With this arrangement, the pump 36 is put out of operation and the water supply valve 93' is closed.

The secondary solution circuit is changed to connect the first effect evaporator A, the pump 47 and the radiator 14 in series. This is accomplished by closing the valves 79, 50, 84, 55', 61' and 76, and opening the valves 78, 51 and 83. With this arrangement, the pump 47 draws the secondary solution from the evaporator A through the pipes 77 and 46 and circulates it through the pipe 70, the radiator 14 and the pipes 71 and 82 back to the evaporator A. In this operation, the entire output of the pump 47 passes through the evaporator A and accordingly the rate of liquid flow through this evaporator is much more rapid than was the case under cooling operation when only a small proportion of the pump output was diverted to the evaporator. As a consequence of this increased rate of flow, no evaporation takes place in the evaporator A, and the secondary solution is merely heated therein sufficiently to raise its temperature by a suitable amount. The amount of heat supplied to the treated air through the radiator 14 may be regulated by adjusting the burner 56 and the valve 80 in the radiator supply by-pass pipe 81.

From the foregoing description, it will be apparent that my improved system incorporates many advantageous features. The change from cooling and dehumidifying action to heating and humidification is easily and quickly made without change in the structure of the apparatus. The same solution pumps, room air circulating fan, radiator, air contactor and evaporator are employed under both operating conditions, and the expense of maintaining idle equipment for extended periods is thus avoided. The use of the secondary hygroscopic salt solution for heating in winter makes it possible to maintain the radiator 14 at temperatures above the boiling point of water without using super-atmospheric pressure in the circuit. For example, a secondary hygroscopic salt solution which is satisfactory for the cooling and dehumidifying operation has a boiling point of 285° F. at atmospheric pressure.

I claim:

1. In an air conditioning system, in combination, means for cooling and dehumidifying the air comprising a contact means, a radiator, means for circulating air under treatment through said contact means, means for circulating a liquid through said contact means in contact with the treated air, means including a heated evaporator for transferring heat from said liquid to said radiator, and means for circulating outdoor air in heat exchanging relation with said radiator, means for heating and humidifying the air passing through said contact means comprising means for circulating said liquid through said contact means independently of said heat transfer means, means for transferring heat from said evaporator to said radiator and means for circulating air under treatment successively in heat exchanging relation with said radiator and through said contact means.

2. In an air conditioning system, in combination, means for cooling and dehumidifying air including means for circulating a liquid in successive contact with air under treatment and with a transfer unit, means in said transfer unit for transferring heat and moisture from the liquid so circulated to a hygroscopic solution, and means including a heated evaporator and a radiator for removing moisture and heat from said hygroscopic solution, means for heating and humidifying the air under treatment including means for circulating said liquid through said air contact means independently of said transfer unit, means for circulating said hygroscopic solution through said evaporator and said radiator independently of said transfer unit and means for circulating treated air through both said radiator and said contact means.

3. In an air conditioning system, in combination, means for cooling and dehumidifying air including means for circulating a liquid in successive contact with air under treatment and with a transfer unit, means in said transfer unit for transferring heat and moisture from the liquid so circulated to a hygroscopic solution, a heated evaporator, means for circulating said hygroscopic solution through said evaporator to remove moisture therefrom, a radiator, means for circulating said hygroscopic solution through said radiator, and means for cooling said radiator by heat exchange with outdoor air whereby heat is removed from said hygroscopic solution, means for heating and humidifying the air under treatment including means for circulating said hygroscopic solution through said heated evaporator and said radiator independently of said transfer unit, means for circulating said liquid in contact with air under treatment independently of said transfer unit and means for conducting air under treatment successively in heat exchanging relation with said radiator and in contact with said liquid.

4. In an air conditioning system, in combination, means for cooling and dehumidifying the air comprising a contact means, means for circulating air under treatment through said contact means, means for circulating a liquid through said contact means in contact with the treated air, means for removing heat and moisture from said liquid including a radiator and a heated evaporator, and means for circulating outdoor air over said radiator to remove heat therefrom, means for heating and humidifying the air passing through said contact means including means for circulating said liquid through said contact means independently of said heat and moisture removing means, means for circulating air under treatment successively over said radiator and through said contact means, and means for circulating a solution successively through said heated evaporator and said radiator whereby the heat is supplied to the air under treatment.

5. In an air conditioning system, in combination, means for cooling and dehumidifying the air comprising a contact means, means for circulating air under treatment through said contact means, means for circulating a liquid in successive contact with the air in said contact means and a body of rarefied air whereby moisture removed from the air under treatment by said liquid is evaporated in said rarefied air, means for circulating a hygroscopic solution in contact with said rarefied air whereby moisture is absorbed from said rarefied air by said hygroscopic solution, means including a heated evaporator for removing moisture from said hygroscopic solution, a radiator, means for circulating said hygroscopic solution through said moisture removing means and said radiator, and means for cooling said radiator by heat exchange with a cooling medium, means for heating and humidifying the air under treatment including means for circulating said liquid through said contact means independently of said body of rarefied air, means for circulating said hygroscopic solution successively through said heated evaporator and said radiator independently of said body of rarefied air, and means for circulating air under treatment successively in heat exchanging relation with said radiator and through said contact means.

6. In an air conditioning system, in combination, means for cooling and dehumidifying the air comprising a contact means, means for circulating air under treatment through said contact means, a closed chamber, means for circulating a liquid successively through said contact means and said closed chamber, means for maintaining said closed chamber under partial vacuum, means for circulating a hygroscopic solution through said closed chamber, means operated by the circulation of said hygroscopic solution for circulating rarefied air in said closed chamber in successive contact with said liquid and said hygroscopic solution, means including a heated evaporator for removing moisture from said hygroscopic solution, a radiator, means for circulating said hygroscopic solution through said moisture removing means and said radiator, and means for circulating outdoor air in heat exchanging relation with said radiator, means for heating and humidifying the air under treatment including means for circulating said liquid through said contact means independently of said closed chamber, means for circulating said hygroscopic solution successively through said heated evaporator and said radiator independently of said closed chamber and means for circulating air under treatment successively in heat exchanging relation with said radiator and through said contact means.

7. In an air conditioning system, in combination, means for cooling and dehumidifying the air comprising a contact means, means for circulating air under treatment through said contact means, a closed chamber, means for circulating a liquid successively through said contact means and said closed chamber, means operated by the circulation of said liquid for maintaining said closed chamber under a partial vacuum, means for circulating a hygroscopic solution through said closed chamber, means including a heated evaporator for removing moisture from said hygroscopic solution, a radiator, means for circulating said hygroscopic solution through said moisture removing means and said radiator, and means for circulating outdoor air in heat exchanging relation with said radiator, means for heating and humidifying the air under treatment including for circulating said liquid through said contact means independently of said closed chamber and said vacuum maintaining means, means for circulating said hygroscopic solution successively through said heated evaporator and said radiator independently of said closed chamber, and means for circulating air under treatment successively in heat exchanging relation with said radiator and through said contact means.

8. In an air conditioning system in combination, means for cooling and dehumidifying the air comprising a contact means, means for circulating air under treatment through said contact means, a closed chamber, means for circulating a liquid successively through said contact means and said closed chamber, means operated by the circulation of liquid for maintaining said closed chamber under a partial vacuum, means for circulating a hygroscopic solution through said closed chamber, means operated by the circulation of said hygroscopic solution for circulating rarefied air in said closed chamber in successive contact with said liquid and said hygroscopic solution, means including a heated evaporator for removing moisture from said hygroscopic solution, a radiator, means for circulating said hygroscopic solution through said moisture removing means and said radiator, and means for circulating outdoor air in heat exchanging relation with said radiator, means for heating and humidifying the air under treatment including means for circulating said liquid through said contact means independently of said closed chamber and said vacuum maintaining means, means for circulating said hygroscopic solution successively through said heated evaporator and said radiator independently of said closed chamber, and means for circulating air under treatment successively in heat exchanging relation with said radiator and through said contact means.

9. In an air conditioning system, in combination, means for cooling and dehumidifying the air comprising means for circulating a liquid in contact with air under treatment, a transfer unit, means for circulating said liquid through the transfer unit, means in said transfer unit for transferring heat and moisture from the liquid so circulated to a hygroscopic solution, a heated evaporator, means for circulating said hygroscopic solution through said evaporator to evaporate moisture therefrom, means for condensing the moisture so evaporated from said hygroscopic solution, a radiator, means for circulating said hygroscopic solution through said radiator, means for cooling said radiator by heat exchange with outdoor air whereby heat is removed from said hygroscopic solution, a spray device adjacent said radiator, and means for supplying said condensed moisture to said spray device whereby such moisture is evaporated in said outdoor air and its cooling effect on said radiator is increased, means for heating and humidifying the air under treatment including means for circulating said hygroscopic solution through said heated evaporator and said radiator independently of said transfer unit, means for conducting air under treatment successively in heat exchanging relation with said radiator and past said spray device and means for supplying water other than said condensed moisture to said spray device for humidifying the air under treatment.

10. In an air conditioning system, in combination, means for cooling and dehumidifying the air comprising means for circulating a liquid in contact with air under treatment, a transfer unit, means for circulating said liquid through the transfer unit, means in said transfer unit for transferring heat and moisture from the liquid so circulated to a hygroscopic solution, a heated evaporator, means for circulating said hygroscopic solution through said evaporator to evaporate moisture therefrom, means for condensing the moisture so evaporated from said hygroscopic solution, a radiator, means for circulating said hygroscopic solution through said radiator, means for cooling said radiator by heat exchange with outdoor air whereby heat is removed from said hygroscopic solution, a spray device adjacent said radiator, and means for supplying said condensed moisture to said spray device whereby such moisture is evaporated in said outdoor air and its cooling effect on said radiator is increased, means for heating and humidifying the air under treatment including means for circulating said hygroscopic solution through said heated evaporator and said radiator independently of said transfer unit, means for circulating said liquid in contact with air under treatment independently of said transfer unit, means for conducting air under treatment successively in heat exchanging relation with said radiator, past said spray device and in contact with said liquid, and means for supplying water other than said condensed moisture to said spray device for humidifying the air under treatment.

11. In an air conditioning system, in combination, means for cooling and dehumidifying the air comprising a contact means, means for circulating air under treatment through said contact means, means for circulating a liquid through said contact means in contact with the treated air, means for removing heat and moisture from the liquid so circulated including a radiator and a heated evaporator, and means for circulating outdoor air over said radiator to remove heat therefrom, means for heating air under treatment including means for circulating air under treatment over said radiator and means for circulating a solution successively through said heated evaporator and said radiator whereby heat is supplied to the air under treatment.

12. In an air conditioning system, in combination, means for cooling and dehumidifying the air comprising a contact means, means for circulating air under treatment through said contact means, means for circulating a liquid in contact with the air in said contact means and a body of rarefied air whereby moisture removed from the air under treatment by said liquid is evaporated in said rarefied air, means for circulating a hygroscopic solution in contact with said rarefied air whereby moisture is absorbed from said rarefied air by said hygroscopic solution, means including a heated evaporator for removing moisture from said hygroscopic solution, a radiator, means for circulating said hygroscopic solution through said moisture removing means and said radiator, and means for cooling said radiator by heat exchange with a cooling medium, and means for heating the air under treatment including means for circulating said hygroscopic solution successively through said heated evaporator and said radiator independently of said body of rarefied air, and means for circulating air under treatment in heat exchanging relation with said radiator.

FREDERICK HYDE HIBBERD.

CERTIFICATE OF CORRECTION.

Patent No. 2,276,970.  March 17, 1942.

FREDERICK HYDE HIBBERD.

It is hereby certified that error appears in the printed specification of the above numbered patent requiring correction as follows: Page 2, first column, lines 51 and 58, and second column, line 23, for "chamber" read --chamber 1--; page 3, first column, line 60, for "breaking" read --heating--; page 6, first column, line 33, claim 7, after "including" insert --means--; and that the said Letters Patent should be read with this correction therein that the same may conform to the record of the case in the Patent Office.

Signed and sealed this 5th day of May, A. D. 1942.

Henry Van Arsdale,
Acting Commissioner of Patents.

(Seal)